J. MATTHEWS.

Soda-Water Apparatus.

No. 9,028. Reissued Jan. 6, 1880.

Witnesses:

John C. Tunbridge

Willy G. Schultz.

Inventor:

John Matthews by his attorney

Aug. Briesen

N. PETERS, PHOTO-LITHOGRAPHER, WASHINGTON, D. C.

UNITED STATES PATENT OFFICE.

JOHN MATTHEWS, OF NEW YORK, N. Y.

SODA-WATER APPARATUS.

SPECIFICATION forming part of Reissued Letters Patent No. 9,028, dated January 6, 1880.

Original No. 50,255, dated October 3, 1865. Application for Reissue filed December 10, 1879.

*To all whom it may concern:*

Be it known that I, JOHN MATTHEWS, of the city, county, and State of New York, have invented a new and Improved Soda-Water and Sirup Cooling and Draft Apparatus, of which the following is a specification.

Figure 1:
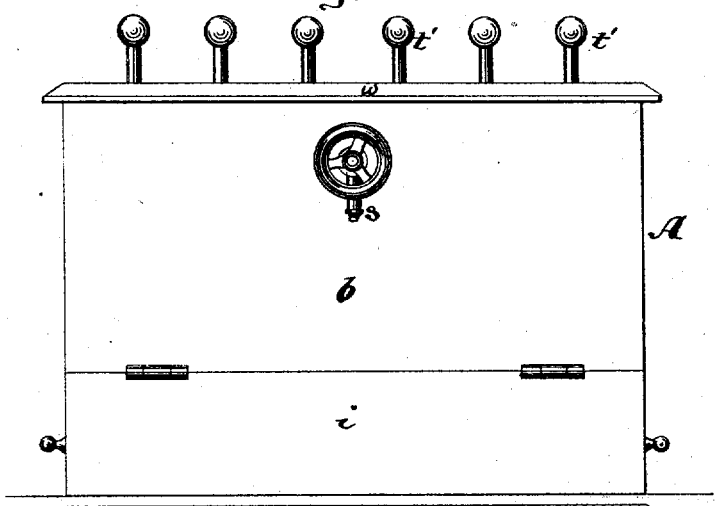
Figure 3:
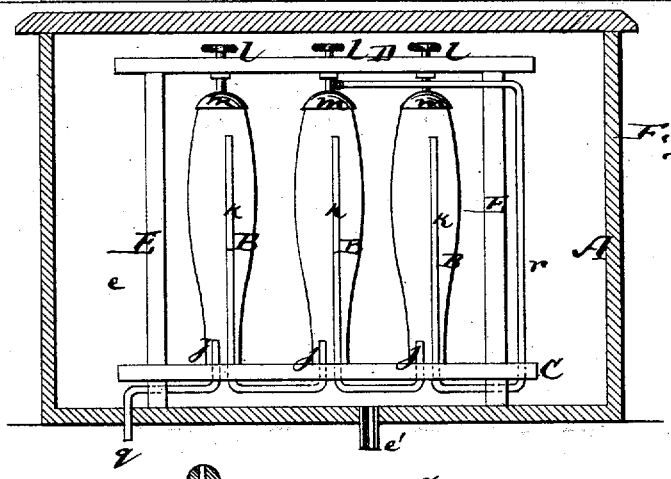
Figure 2:
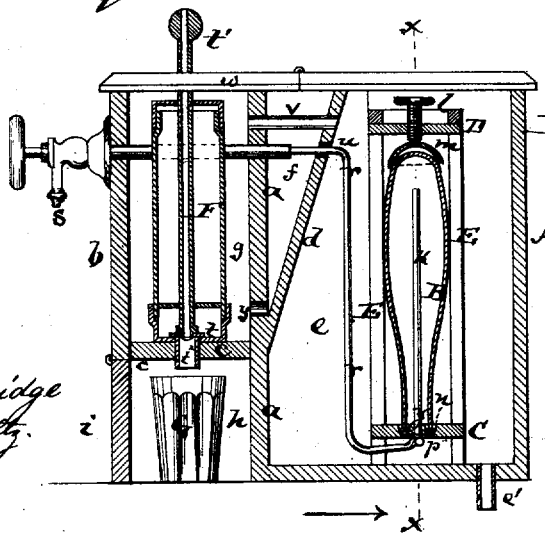

Figure 1 is an elevation of the apparatus. Fig. 2 is a vertical section of the same from back to front. Fig. 3 is a vertical section of the same, parallel with the back and front, in the plane indicated by the line *x x* in Fig. 2.

This invention consists in a novel construction of the soda-water cooler and a novel arrangement of the said cooler, the ice-chamber, the sirup-vessels, and a chamber for the tumblers within the box or casing of the apparatus, whereby the cooling of the soda-water, sirups, and tumblers is performed by a small quantity of ice, facility is afforded for cleaning the sirup-vessels, and the draft-outlets of the said vessels are protected from flies.

A is a box of wood or other material, of suitable form and size to stand upon a counter or table, having a vertical partition, *a*, extending from top to bottom at a suitable distance from the draft side *b*, a horizontal partition, *c*, extending from the partition *a* to the face *b*, and an inclined partition, *d*, extending from the lower part of the partition *a* to the top. These partitions divide the box, as shown in Fig. 2, into four compartments, *e*, *f*, *g*, and *h*. The chamber *e* contains the soda-water cooler, surrounded with ice, and extends down to the lower level of the apparatus. The middle chamber, *f*, also contains ice. The upper chamber, *g*, contains the sirup-vessels, and the lower chamber, *h*, contains the tumblers. The chamber *h* is in line with the lower part of chamber *e* and below the sirup-discharge faucets $t^2$.

The top of the box is composed of or provided with one or more hinged or otherwise-movable lids, which are opened for the introduction of ice, the removal of the cooler, and the removal or filling of the sirup-vessels.

The tumbler-chamber *h* is made with a door or movable shutter, *i*, which is opened for drawing the sirup, but closed to shut up the tumblers and the draft-outlets of the sirup-vessels whenever any considerable time elapses between the drawings of sirup.

The cooler consists of any suitable number of long, narrow, upright, open-bottomed, and close-topped vessels, B B, and pipes *j j* and *k k*. The said vessels are arranged in a suitable frame, C D E, on the bottom piece, *c*, of which the said vessels are firmly held by means of set-screws *l l* screwing through the top piece, D, and pressing upon caps *m m* applied on the tops of the vessels, the said screws pressing down the edges of the open bottoms of the vessels upon india-rubber or other soft packing-rings *n n* inserted into annular grooves in the piece C, for the purpose of forming water-tight joints.

The pipes *j k* of each vessel are united by a flange-piece, *p*, Fig. 2, which is secured, with a water-tight packing, to the piece C, and the said pipes are inserted into the vessel through an opening in the piece C.

The inlet-pipe *j* enters the vessel but a short distance; but the outlet-pipe *k* extends nearly to the top, and by this means the soda-water is compelled to pass up and down the whole height of the vessel, which is completely immersed in ice or water, and gas is prevented from accumulating and remaining in any considerable quantity in the upper part of the vessel.

The pipe from the fountain is connected at *q*, Fig. 3, with the inlet-pipe of the first vessel of the train, and the outlet-pipe of that vessel connected with the inlet-pipe of the next one, and the outlet-pipe of the latter with the inlet-pipe of the next one, and so on through the whole train, as may be seen by tracing the connections from the left toward the right of Fig. 3, so that the soda-water may pass through the several vessels in succession.

The outlet-pipe *k* of the last vessel is connected with the draft-pipe *r*, which passes through the ice-chamber *f* and sirup-cooling chamber *g* to the draft-cock *s* at the outer side of the box or case.

The sirup-vessels F, Fig. 2, stand upon the horizontal partition *c*, which forms the bottom of their cooling-chamber *g*, and their draft-outlets $t^2$, which consist of short tubes projecting from their bottoms, pass through water-tight packing in or around holes in the said partition, to enable the sirups to be drawn into tumblers G placed in the chamber *h*.

The sirups are drawn off by opening valves $t$ $t$ in the bottoms of the vessels, the stems $t'$ of the said valves being extended upward through the top plate, $w$, of the stand, where they are furnished with handles.

The sirup-vessels which I propose generally to employ in this stand, and which are represented in the drawings, are of peculiar construction for measuring the sirups; but as this feature constitutes a separate invention, no further description of it is here necessary.

The opening provided in the partition $a$ for the passage of the draft-pipe $r$ has the said pipe fitted snugly into it; but the opening $u$, Fig. 2, provided in the partition $d$ for the said pipe is larger than the exterior of the pipe, that the ice-water may flow from the ice-chamber $f$ into the cooling-chamber $e$ and fill the said chamber to the level of the tops of the vessels B B. There is also an opening, $y$, Fig. 2, of larger area than $u$, from the lower part of the ice-chamber to the sirup-cooling chamber $g$, for the flow of ice-water to the latter chamber. One or more pipes, $v$, Fig. 2, form a communication between the upper parts of the chambers $g$ and $e$, the said pipes passing through the ice-chamber $f$. The chamber $e$ is also furnished with waste-pipe $e'$.

The connection of the fountain being made at $q$, Fig. 3, and the chambers $f$ and $e$ being kept filled with ice, the operation is as follows: As the ice in the chamber $f$ melts, its water runs through the opening $y$ into the sirup-cooling chamber $g$ and surrounds the sirup-vessels F, and owing to the pipes $v$ being kept cool by being covered with ice there will be a constant upward circulation of warmer water from the lower part of the chamber $g$ through the said pipes into the chamber $e$, from which it escapes by the waste-pipe $e'$, along with the water resulting from the ice melting in that chamber.

The chamber $h$ not only forms a convenient place for keeping the tumblers in when not in use, but serves as a cooler for them, and when its door or shutter $i$ is closed protects the outlets $t^2$ of the sirup-vessels from flies.

When it is desired to remove the sirup-vessels for refilling or cleaning them, it is not necessary to make any disconnection of cocks or pipes, for when the lid which covers the top of the chamber $g$ is opened or removed the said vessels can be lifted out of their places.

What I claim as my invention, and desire to secure by Letters Patent, is—

1. The soda-water cooler consisting of one or more open-bottomed and close-topped vessels, B B, fitted and secured in a frame, C D E, within the cooling-chamber, and having inlet and outlet pipes $j$ $k$ applied and arranged for the circulation of the soda-water through them, substantially as herein described.

2. The arrangement of the sirup-cooling chamber $g$, cooling-chamber $e$, ice-chamber $f$, and communications $y$ and $v$ within the case or box A of the draft apparatus, substantially as and for the purpose herein specified.

3. The tumbler-chamber $h$, arranged within the box or case A of the draft apparatus below the discharge-faucet $t^2$ and in line horizontally with the ice-chamber $e$, substantially as and for the purpose herein set forth.

4. The sirup-vessel F, having an outlet at the bottom, in communication with an opening in the bottom of the containing-chamber, substantially as herein specified, whereby its removal is facilitated.

5. In a dispensing apparatus, the ice-chamber $e$, made to extend downward behind the tumbler-recess, substantially as herein shown and described.

6. The horizontal partition C, containing the vertical discharge-faucet $t^2$, in combination with vertical valve-rod $t'$ and valve $t$, for opening and closing the faucet $t^2$ from above, substantially as herein shown and described.

7. An apparatus having its front portion to contain an overhanging recess or chamber, $g$, containing the sirup valves and faucets, which are operated through the cover of the chamber and discharged into a recess, $h$, within which the drinking-tumblers are placed to receive the sirups or beverage.

8. The faucet-inclosing cell or recess $g$, communicating with the main ice-chamber $e$ of the apparatus, and provided with a lower plate pierced with openings through which the sirups are discharged.

9. A plate or cover, $w$, surmounting the faucet-inclosing recess, pierced with openings through which the movement of the sirup-valves is effected.

JOHN MATTHEWS.

Witnesses:
FREDERICK MATTHEWS,
TOMPSON B. MOSHER.